H. H. HEYLMUN.
OPTICAL INSTRUMENT.
APPLICATION FILED MAY 26, 1919.
1,355,397.
Patented Oct. 12, 1920.
3 SHEETS—SHEET 2.
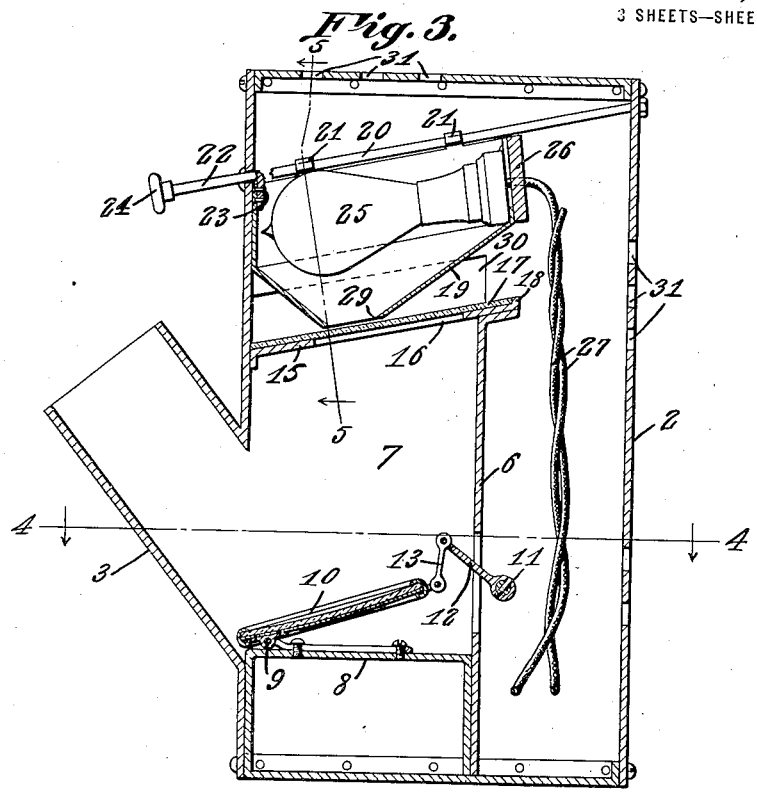
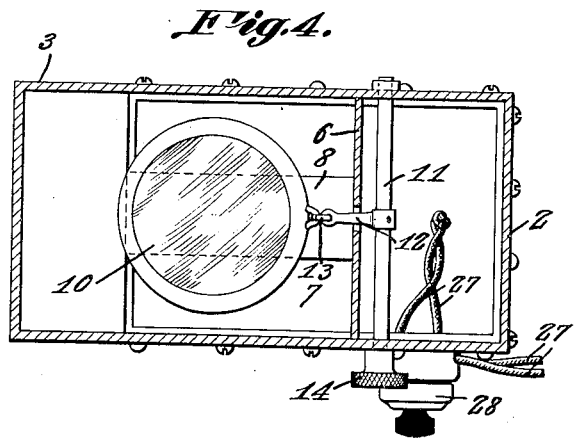
H.H.Heylmun, Inventor
By C.A.Snow & Co.
Attorneys
Witness

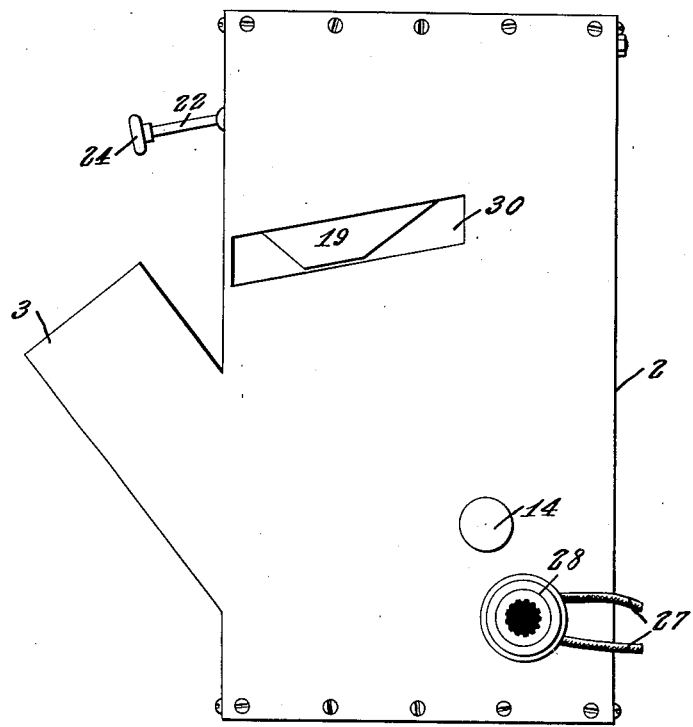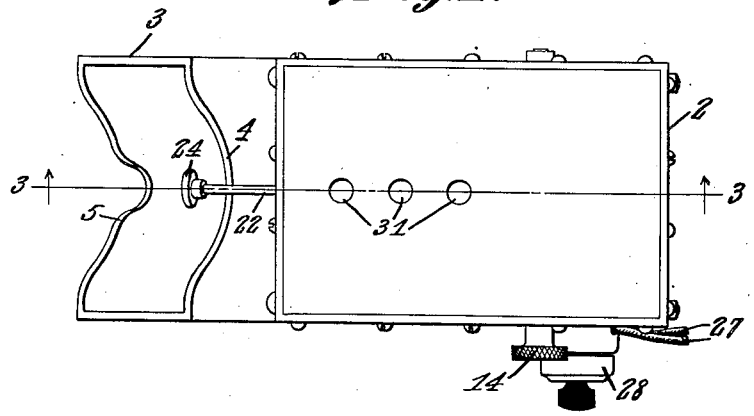

H. H. HEYLMUN.
OPTICAL INSTRUMENT.
APPLICATION FILED MAY 26, 1919.

1,355,397.

Patented Oct. 12, 1920.
3 SHEETS—SHEET 3.

H. H. Heylmun, Inventor

Witness

By C. A. Snow & Co.
Attorneys

UNITED STATES PATENT OFFICE.

HARRY H. HEYLMUN, OF LONG BEACH, CALIFORNIA.

OPTICAL INSTRUMENT.

1,355,397.  Specification of Letters Patent.  Patented Oct. 12, 1920.

Application filed May 26, 1919. Serial No. 299,818.

*To all whom it may concern:*

Be it known that I, HARRY H. HEYLMUN, a citizen of the United States, residing at Long Beach, in the county of Los Angeles and State of California, have invented a new and useful Optical Instrument, of which the following is a specification.

This invention relates to improvements in optical instruments, the object of the invention being to provide an instrument that is particularly adapted for the examination of films or X-ray pictures, the device being so constructed that an illuminated image of the film may be thrown on to a concave mirror at different angles, and which mirror may be set at different angles to an aperture at one side of the instrument.

With the foregoing and other objects in view, which will appear as the description proceeds, the invention consists in the novel features of construction and combination of parts which will be more fully described hereinafter and particularly pointed out in the claims.

In the drawings accompanying and forming part of this specification.

Figure 1 is a side elevation of an instrument constructed in accordance with the present invention;

Fig. 2 is a plan view thereof;

Fig. 3 is a vertical section taken on the line 3—3 of Fig. 2, the supporting rod being broken away;

Fig. 4 is a cross section taken on the line 4—4 of Fig. 3;

The same characters of reference designate the same parts in the different figures of the drawings.

Figure 5:
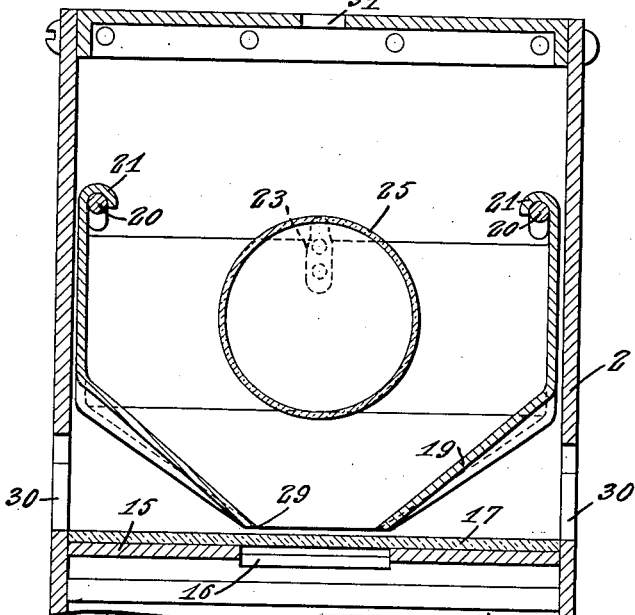
Fig. 5 is a detail sectional view taken on the line 5—5 of Fig. 3.

Referring to the drawings, 2 designates a housing, which may be of any preferred form in cross section, being shown herein as rectangular in shape and provided with an extension 3 the upper and lower walls of which may be suitably shaped at their outer ends to approximately conform to the contour of the human face respectively above and below the eyes, as shown at 4 and 5. Within the housing 2 is secured a partition 6, forming a chamber or compartment 7 communicating with the extension 3. A platform 8 is erected at the lower end of the chamber 7, and upon this platform is pivotally mounted, as at 9, a concave reflecting mirror 10 in position to be viewed from the end of the extension 3. Means is provided for swinging the mirror on its pivot to different angles, and in the present instance this means comprises a rockable shaft 11 mounted in the side walls of the housing and having an arm 12 secured thereto approximately at the middle of its length and projecting through a slot in the partition 6 into the mirror compartment 7. The arm 12 is connected by means of a link 13 with the mirror at a point diametrically opposite the pivotal connection of the mirror with the platform, and the shaft 11 is provided outside of the housing with a knurled head 14 by means of which it may be rocked in its bearings, thereby to raise or lower the mirror to different angular positions relatively to eyes of an observer at the opening of the extension 3. An inclined platform 15 is mounted above the compartment 7, being secured at one end to the front wall of the housing and its opposite end resting on the upper end of the partition 6, said platform having formed therein, approximately at its center, an opening 16, which may be rectangular or of any other form most suitable for the particular pictures that are to be examined. A transparent plate 17 rests on the platform 15 and is retained thereon in any suitable manner, as for instance by an upturned flange 18 on the upper end of the platform. A shield 19 is mounted for sliding movement on a pair of rods 20 secured in the front and rear walls of the housing in an inclined position, as shown in Fig. 3, the shield being provided at the upper edges of its side walls with a plurality of hook-shaped members 21 engaging the rods 20. A short operating rod 22 passes through the front wall of the housing and engages at its inner end the front wall of the shield 19, as shown at 23, Fig. 3, a push button 24 being secured on the outer end of said rod for convenience in operation. A source of light, such as an electric bulb 25, is mounted on a base 26 forming the back wall of the shield and is connected by wires 27 with a switch 28 located outside of the housing. The bottom of the shield is preferably tapered from the sides thereof toward a point so as to form approximately an inverted truncated pyramid having an opening 29 of a size to permit the passage of sufficient light through the film to be examined, the lower end of the shield being spaced from the transparent plate just far enough to permit the insertion of a film between the shield and the plate. An opening 30 is preferably provided in each side wall of the housing for permitting insertion and removal of the film, and the housing may also be provided with suitable ventilating openings 31.

From the foregoing it will be seen that I have provided an instrument in which not only can the angle of the film to the reflecting mirror and that of the mirror to the eyes of the observer be changed by the operation of the rocking shaft 11, but the position of the film and the source of light with relation to the transparent plate may also be changed so as to provide the proper focus for the angle to which the mirror is set.

Figure 6:
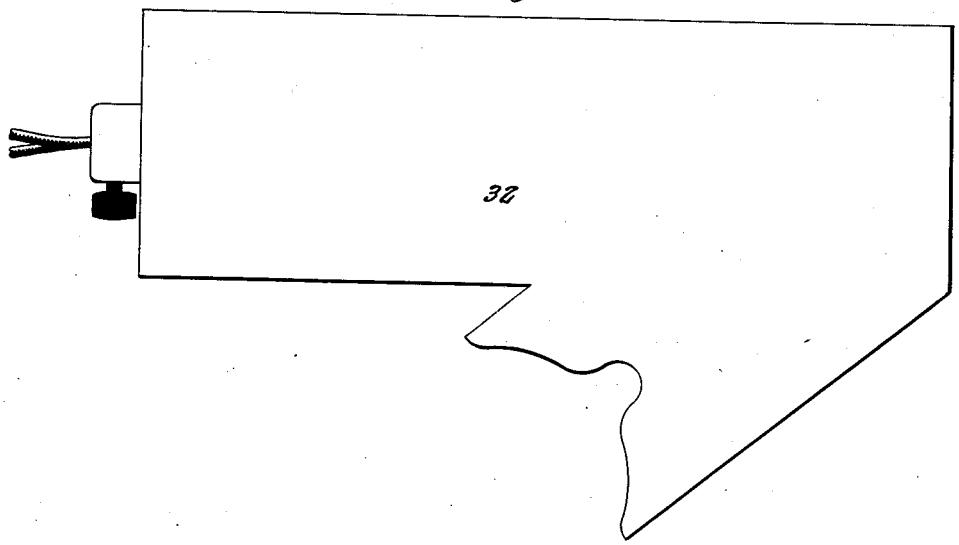
Fig. 6 is a side elevation of a modified form of housing.

As hereinbefore stated, the exterior form of the housing is immaterial, and in Fig. 6 I have illustrated a cylindrical housing 32 that is specially adapted for instruments that may be held in any desired position. In practice it is contemplated inclosing the instrument in a housing which may be either cylindrical or rectangular in form and mounted on a stand adapted to permit adjustment of the housing to any desired position, but as the stand is not an essential part of my invention I have deemed it unnecessary to illustrate it herein.

While I have described in detail the structure herein illustrated, it is to be understood that I do not thereby limit my invention to the precise features of construction shown, as I am aware that many mechanical changes and modifications may be made therein without departing from the spirit and scope of the invention as set forth in the claims appended hereto.

Having thus described my invention, what I claim is:

1. An instrument of the class described including a housing, an angularly adjustable mirror therein, a transparent support, a light shield having an opening adjacent the support, a lamp carried by and movable with the shield, and means for sliding the shield and lamp relative to the transparent support, said mirror being positioned to receive light rays from the opening in the shield.

2. An instrument of the class described including a housing having a sight opening, an angularly adjustable mirror in the housing and visible through the opening, a transparent film support, a lamp, a light shield interposed between the lamp and film support and having an opening adjacent said support for the escape of rays to the mirror, and means for sliding the shield and lamp relative to the support and along lines parallel therewith.

3. In an instrument of the class described a housing having a sight opening, an angularly adjustable mirror in the housing and visible through the opening, a transparent film support, guides parallel with said support, a shield slidably mounted on the guides and having an opening close to the film support for the escape of light rays, a lamp mounted upon and movable with the shield, said shield being interposed between the lamp and the film support, and means projecting through the housing for actuating the shield.

4. The combination with a housing having a sight opening, of an angularly adjustable mirror visible through the opening, a transparent film support, guide rods parallel therewith, a shield suspended from and movable along the rods and having an opening for the escape of light rays, said opening being disposed close to and movable along lines parallel with the transparent film support, a lamp carried by the shield for directing its rays through said opening, and toward the mirror, and means projecting from the housing and connected to the shield for shifting said shield along the rods and relative to the film support and the mirror.

In testimony that I claim the foregoing as my own, I have hereto affixed my signature in the presence of two witnesses.

HARRY H. HEYLMUN.

Witnesses:
 TRUE BLEISTEIN,
 LOUIS MURDOCK.